US012555892B2

(12) United States Patent
Lin et al.

(10) Patent No.: US 12,555,892 B2
(45) Date of Patent: Feb. 17, 2026

(54) ELECTRONIC DEVICE AND ANTENNA MODULE

(71) Applicants: Chih-Heng Lin, Taipei (TW); Li-Chun Lee, Taipei (TW); Shih-Chia Liu, Taipei (TW); Jui-Hung Lai, Taipei (TW); Hung-Yu Yeh, Taipei (TW)

(72) Inventors: Chih-Heng Lin, Taipei (TW); Li-Chun Lee, Taipei (TW); Shih-Chia Liu, Taipei (TW); Jui-Hung Lai, Taipei (TW); Hung-Yu Yeh, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 209 days.

(21) Appl. No.: 18/473,267

(22) Filed: Sep. 24, 2023

(65) Prior Publication Data

US 2024/0113414 A1 Apr. 4, 2024

Related U.S. Application Data

(60) Provisional application No. 63/411,625, filed on Sep. 29, 2022.

(51) Int. Cl.
*H01Q 1/22* (2006.01)
*H01Q 9/04* (2006.01)

(52) U.S. Cl.
CPC ......... *H01Q 1/2291* (2013.01); *H01Q 9/0414* (2013.01); *H01Q 9/0421* (2013.01)

(58) Field of Classification Search
CPC .. H01Q 1/2291; H01Q 9/0414; H01Q 9/0421; H01Q 5/342; H01Q 7/00; H01Q 21/28; H01Q 1/2266; H01Q 1/243; H01Q 5/378; H01Q 9/42
See application file for complete search history.

(56) References Cited

U.S. PATENT DOCUMENTS

| | | | | |
|---|---|---|---|---|
| 2019/0237847 | A1* | 8/2019 | Wu | H01Q 9/42 |
| 2020/0058981 | A1* | 2/2020 | Chang | H01Q 1/48 |
| 2020/0341520 | A1* | 10/2020 | Chen | H01Q 1/2266 |
| 2021/0151871 | A1* | 5/2021 | Lyu | H01Q 1/521 |
| 2022/0393360 | A1* | 12/2022 | Zhang | H01Q 1/2291 |
| 2023/0216173 | A1* | 7/2023 | Chang | H01Q 1/2283 343/702 |

FOREIGN PATENT DOCUMENTS

| | | |
|---|---|---|
| TW | 201611408 | 3/2016 |
| TW | M593666 | 4/2020 |

OTHER PUBLICATIONS

TWM593666U_Machine_Translation (Year: 2020).*
"Office Action of Taiwan Counterpart Application", issued on Aug. 7, 2024, pp. 1-8.

* cited by examiner

*Primary Examiner* — Dameon E Levi
*Assistant Examiner* — Michael M Bouizza
(74) *Attorney, Agent, or Firm* — JCIPRNET

(57) ABSTRACT

Disclosed is an electronic device including a device body and an antenna module. The antenna module includes a conductive element and at least one antenna element. The conductive element includes a main body portion and at least one assembly portion connected with each other. The at least one assembly portion is assembled on the device body. The at least one antenna element is disposed on the device body and coupled with the conductive element to excite a first resonance mode. The at least one assembly portion overlaps the at least one antenna element in the length direction of the main body portion.

9 Claims, 14 Drawing Sheets

ELECTRONIC DEVICE AND ANTENNA MODULE

CROSS-REFERENCE TO RELATED APPLICATION

This application claims the priority benefit of U.S. provisional application Ser. No. 63/411,625, filed on Sep. 29, 2022. The entirety of the above-mentioned patent application is hereby incorporated by reference herein and made a part of specification.

BACKGROUND

Technical Field

The present disclosure relates to an electronic device and an electronic module thereof, and more particularly to an electronic device and an antenna module thereof.

Description of Related Art

In a notebook computer, when an antenna is arranged inside the upper end of the screen, since the screen of the notebook computer is designed with a narrow frame, the space for the arrangement of antenna will be limited. However, when the antenna is arranged inside the lower end of the screen of the notebook computer, at the hinge or inside the host, the antenna is very likely to encounter problems such as noise interference or poor field pattern.

SUMMARY

The present disclosure provides an electronic device that may be provided with an antenna module with good radiation efficiency in a limited space.

The present disclosure provides an antenna module that may be provided in a limited space and has good radiation efficiency.

An electronic device of the present disclosure includes a device body and an antenna module. The antenna module includes a conductive element and at least one antenna element. The conductive element includes a main body portion and at least one assembly portion connected with each other. The at least one assembly portion is assembled on the device body. The at least one antenna element is disposed on the device body and coupled with the conductive element to excite a first resonance mode. The at least one assembly portion overlaps the at least one antenna element in the length direction of the main body portion.

An antenna module of the present disclosure includes a conductive element and at least one antenna element. The conductive element includes a main body portion and at least one assembly portion connected with each other. The at least one assembly portion is assembled on the device body. The at least one antenna element is disposed on the device body and coupled with the conductive element to excite a first resonance mode. The at least one assembly portion overlaps the at least one antenna element in the length direction of the main body portion.

In an embodiment of the present disclosure, the above-mentioned at least one antenna element includes an insulating carrier and a first radiating portion. The insulating carrier is disposed in the device body. The first radiating portion is disposed on the insulating carrier. The first radiating portion overlaps the conductive element in a direction perpendicular to the length direction, so that the first radiating portion is coupled with the conductive element to excite the first resonance mode.

In an embodiment of the present disclosure, the above-mentioned at least one antenna element further includes a ground structure. The ground structure is disposed on the device body. The first radiating portion has a feeding point and a ground point, and the ground point is connected to the ground structure. The first radiating portion and the ground structure form a loop to excite a second resonance mode.

In an embodiment of the present disclosure, the above-mentioned at least one antenna element further includes a second radiating portion. The second radiating portion is disposed on the insulating carrier and separated from the first radiating portion and the ground structure. The second radiating portion is coupled with the ground structure to excite a third resonance mode.

In an embodiment of the present disclosure, the above-mentioned second radiating portion has an L-shaped segment.

In an embodiment of the present disclosure, the above-mentioned device body includes a metal housing, and the metal housing has at least one slot. The antenna module further includes at least one insulating structure, and the at least one insulating structure is embedded in the at least one slot, and the at least one antenna element is disposed on the at least one insulating structure.

In an embodiment of the present disclosure, the above-mentioned at least one assembly portion extends from the main body portion in a direction perpendicular to the length direction.

In an embodiment of the present disclosure, the number of the above-mentioned at least one assembly portion is two, and the two assembly portions are arranged at intervals along the length direction.

In an embodiment of the present disclosure, the above-mentioned device body includes a frame, the frame covers the antenna element, and the length direction is perpendicular to the width direction of the frame.

In an embodiment of the present disclosure, the above-mentioned main body portion is exposed from the device body.

Based on the above, the antenna module of the present disclosure not only includes the antenna element, but also includes a conductive element for coupling with the antenna element to excite the first resonance mode. Accordingly, the size of the antenna element itself may be reduced, thereby reducing the requirement for configuration space for the antenna element, and an antenna module with a good radiation efficiency may be provided in a limited space (for example, inside the upper end of the screen of notebook computer). Furthermore, the assembly portion of the conductive element of the present disclosure overlaps the antenna element in the length direction (for example, the extending direction of the screen frame of a notebook computer) of the main body portion of the conductive element. In this way, in a direction perpendicular to the length direction (for example, the width direction of the frame of the screen of a notebook computer), the assembly portion of the conductive element will not exceed the range where the antenna element is located, and it will not be necessary to overly increase the configuration space for the arrangement of the conductive element.

DESCRIPTION OF THE EMBODIMENTS

Figure 1A:
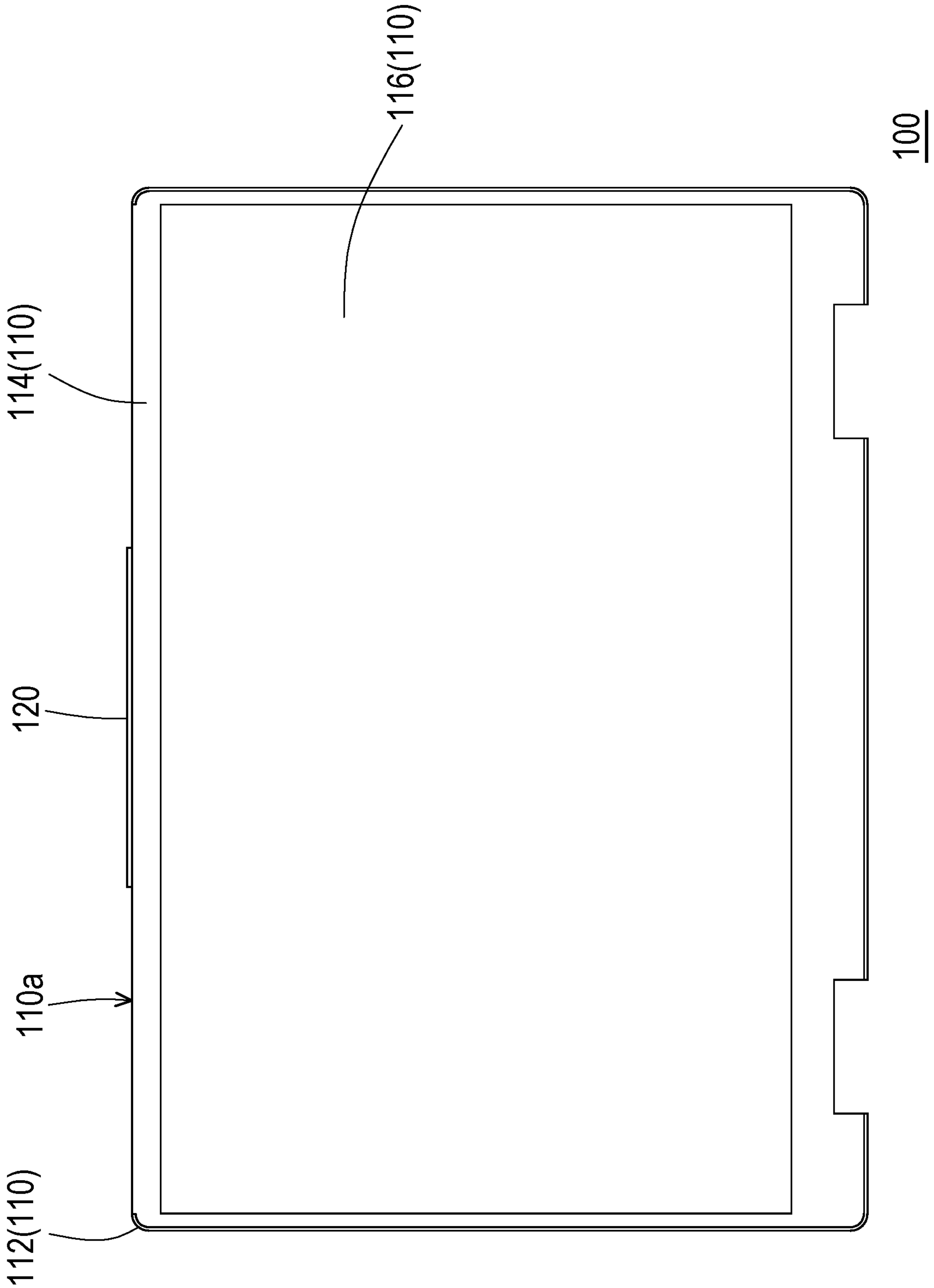
FIG. 1A is a front view of an electronic device according to an embodiment of the present disclosure.
Figure 1B:
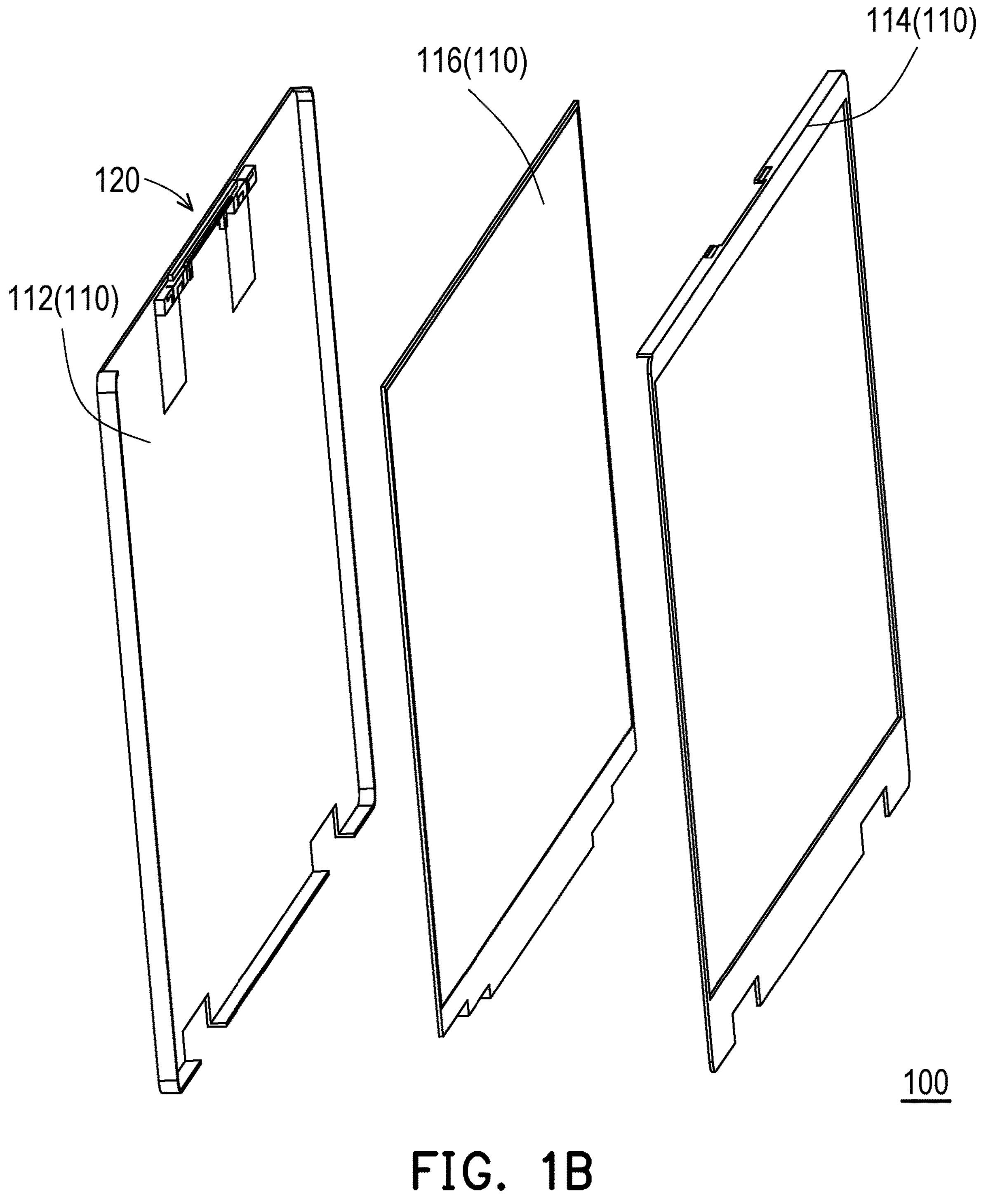
FIG. 1B is an exploded view of the electronic device of FIG. 1A.
Figure 1C:
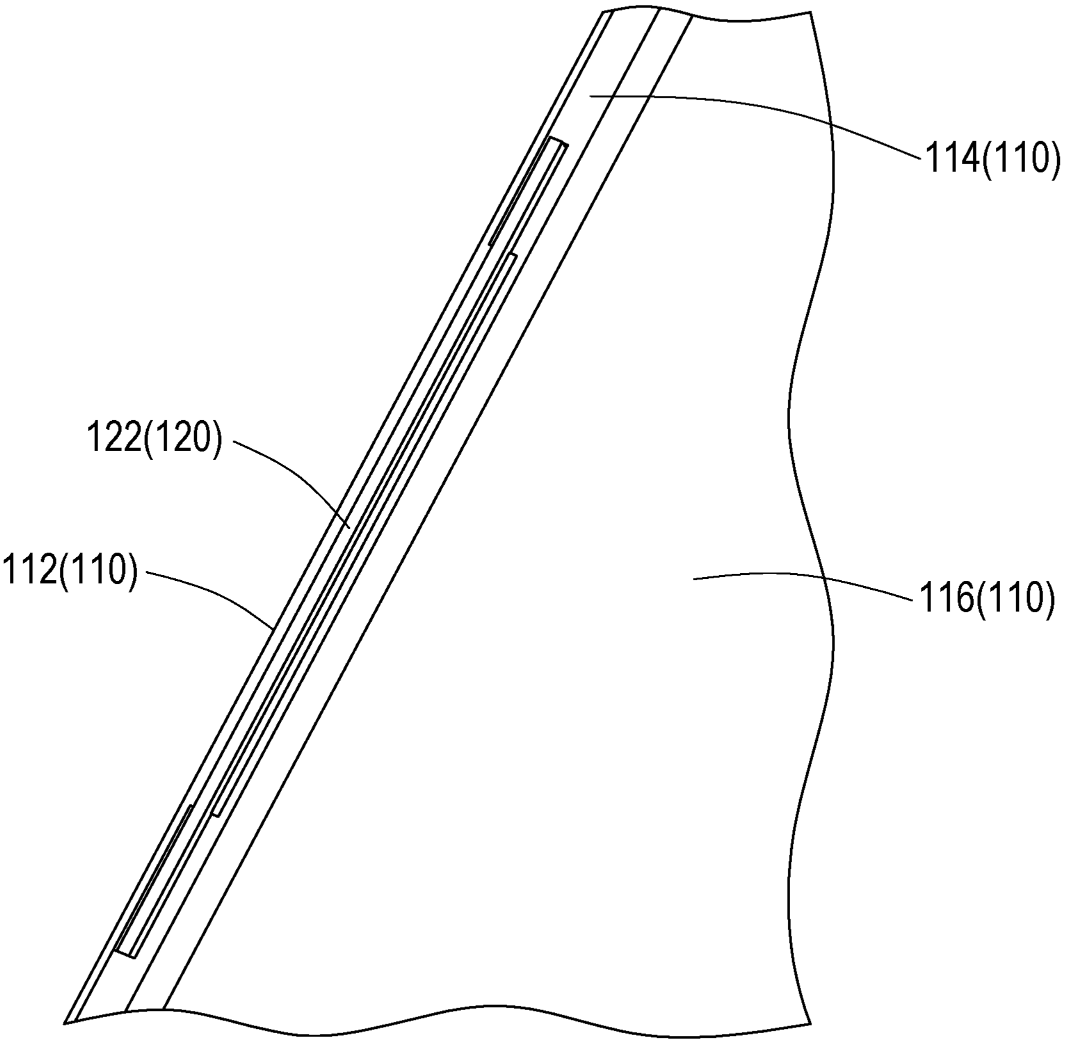
FIG. 1C is a partial three-dimensional view of the electronic device of FIG. 1A.

FIG. 1A is a front view of an electronic device according to an embodiment of the present disclosure. FIG. 1B is an exploded view of the electronic device of FIG. 1A. FIG. 1C is a partial three-dimensional view of the electronic device of FIG. 1A. Referring to FIG. 1A to FIG. 1C, the electronic device 100 of this embodiment includes a device body 110 and an antenna module 120. The antenna module 120 is disposed on the upper end 110*a* of the device body 110.

In this embodiment, the electronic device 100 is, for example, a notebook computer, and the device body 110 is, for example, a screen of the notebook computer and further includes a metal housing 112, a frame 114 and a display module 116. The frame 114 is assembled on the metal housing 112, and the antenna module 120 is disposed on the metal housing 112 and at least partially covered by the frame 114. It should be noted that, in order to make the drawing more concise, only the screen of the notebook computer is shown in the figure and the host of the notebook computer is omitted. In addition, in other embodiments, the electronic device 100 may be other types of electronic products, which is not limited in the present disclosure.

Figure 2A:
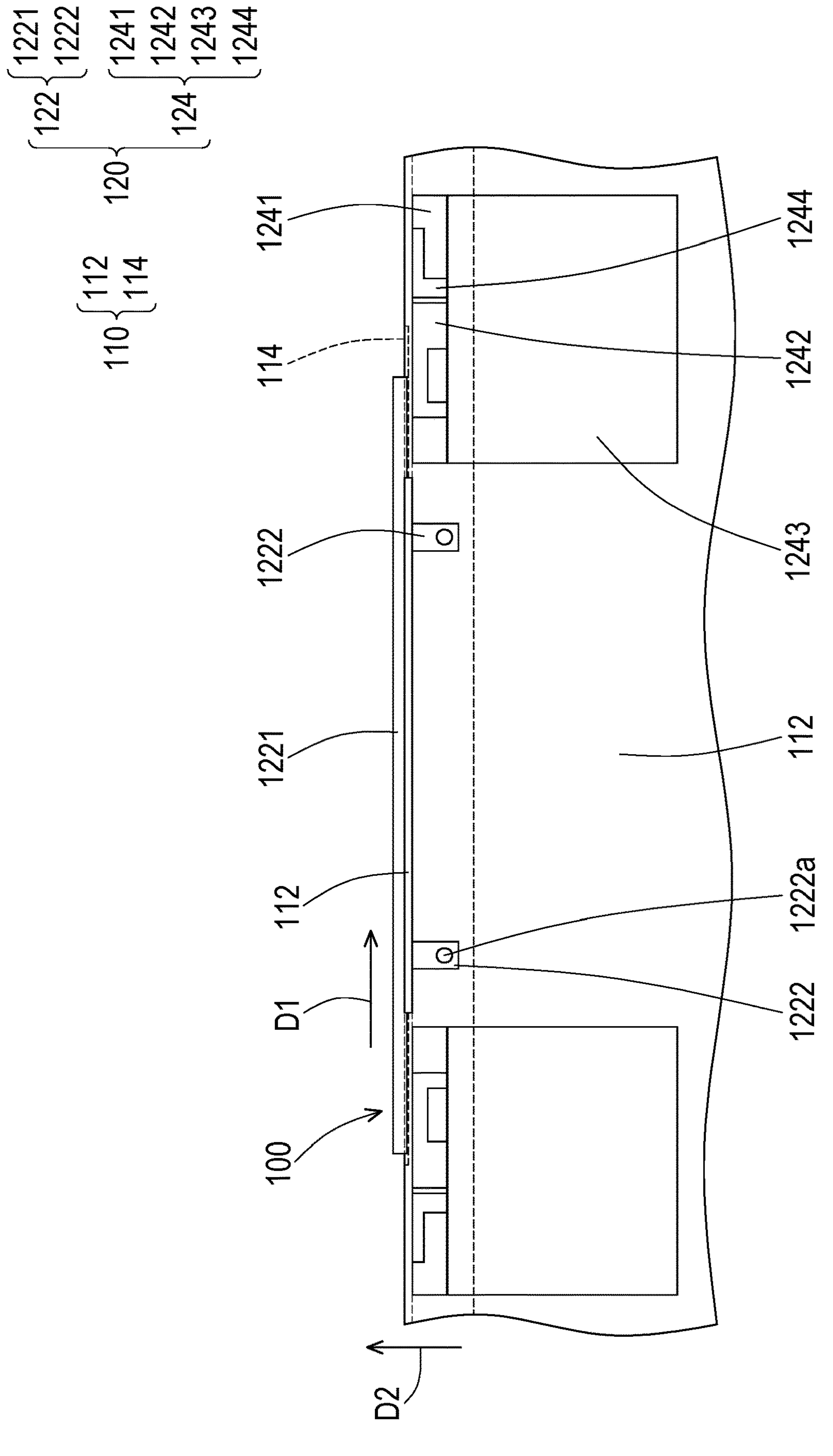
FIG. 2A is a partial perspective view of the electronic device of FIG. 1B.
Figure 2B:
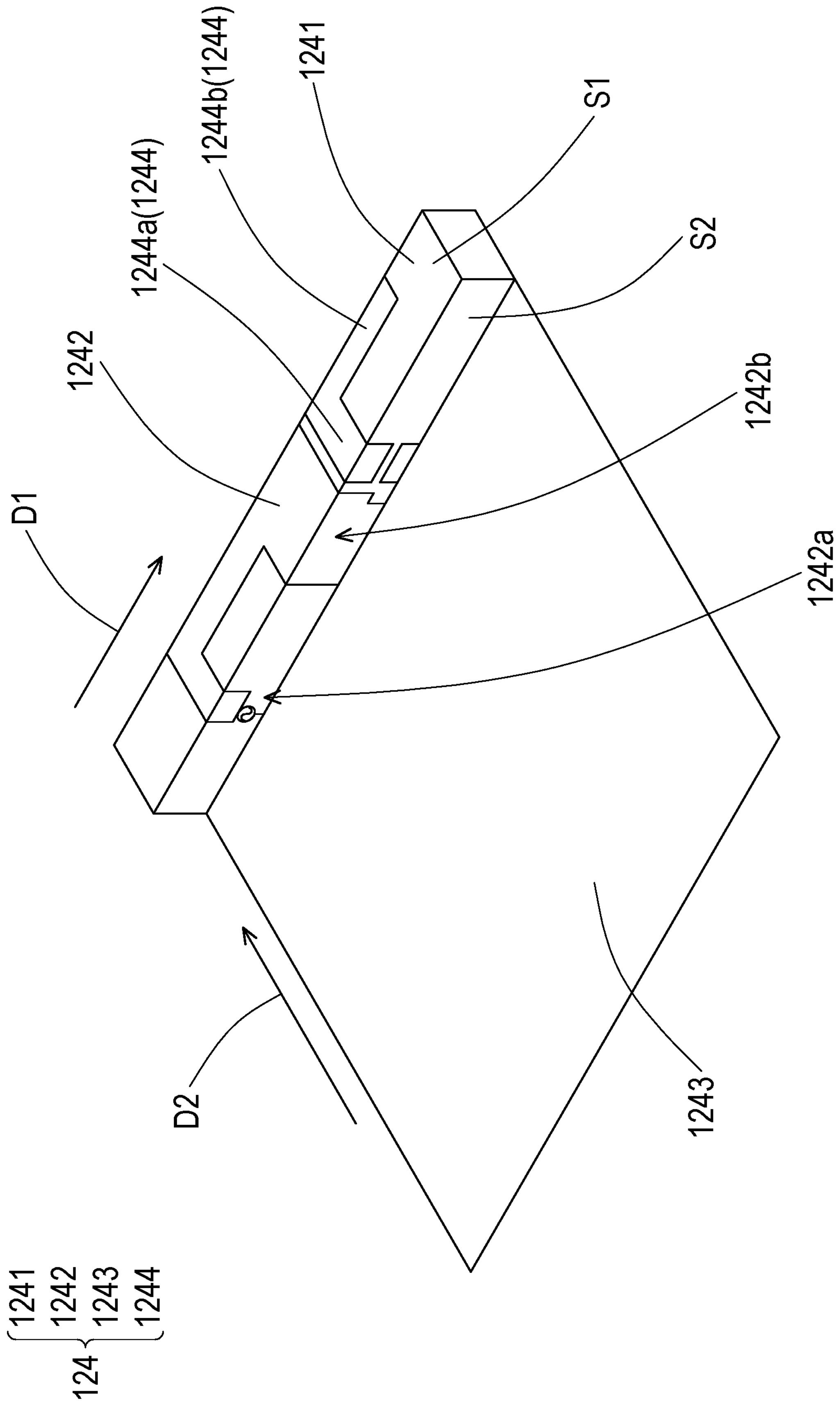
FIG. 2B is a three-dimensional view of the antenna element of FIG. 2A.
Figure 2C:
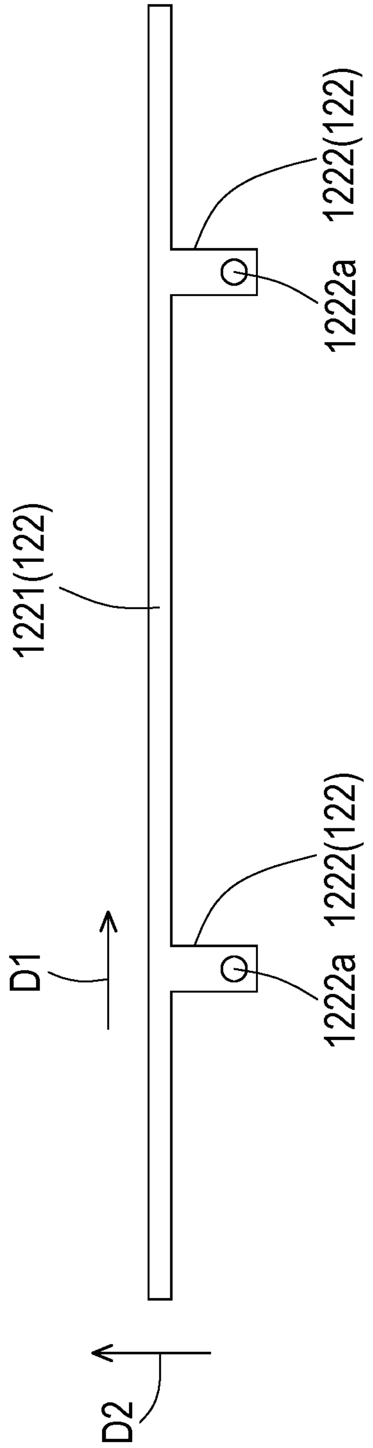
FIG. 2C is a front view of the conductive element of FIG. 2A.

FIG. 2A is a partial perspective view of the electronic device of FIG. 1B. FIG. 2B is a three-dimensional view of the antenna element of FIG. 2A. FIG. 2C is a front view of the conductive element of FIG. 2A. Referring to FIG. 2A to FIG. 2C, the antenna module 120 of this embodiment includes a conductive element 122 and at least one antenna element 124 (two are shown). The conductive element 122 includes a main body portion 1221 and at least one assembly portion 1222 (two are shown) connected to each other. The assembly portion 1222 is assembled on the device body 110. The conductive element 122 may be made of iron, for example, but the present disclosure is not limited thereto. The antenna element 124 is disposed on the metal housing 112 of the device body 110 and covered by the frame 114, and the assembly portion 1222 overlaps the antenna element 124 in the length direction D1 of the main body portion 1221. The antenna element 124 is coupled with the conductive element 122 to excite a first resonance mode (for example, 2.4 GHz).

As mentioned above, the antenna module 120 of this embodiment not only includes the antenna element 124, but also includes the conductive element 122 for coupling with the antenna element 124 to excite the first resonance mode. Accordingly, the size of the antenna element 124 itself is reduced, thereby reducing the space requirement for the configuration of the antenna element 124, and an antenna module 120 with good radiation efficiency may be provided in a limited space (for example, inside the upper end of the screen of a notebook computer). Furthermore, the assembly portion 1222 of the conductive element 122 of this embodiment overlaps the antenna element 124 in the length direction D1 (for example, the length extension direction of the frame of the screen of a notebook computer) of the main body portion 1221 of the conductive element 122. In this way, in a direction D2 perpendicular to the length direction D1 (for example, the width direction of the frame of the screen of a notebook computer), the assembly portion 1222 of the conductive element 122 will not exceed the range where the antenna element 124 is located, and it will not be necessary to overly increase the configuration space for the arrangement of the conductive element 122, as well as overly increase the width of the frame of the screen of the notebook computer for the arrangement of the conductive element 122.

The structure of the antenna element 124 of this embodiment will be described in detail below.

Please refer to FIG. 2B. The antenna element 124 of this embodiment includes an insulating carrier 1241 and a first radiating portion 1242. The insulating carrier 1241 is disposed on the metal housing 112 and located in the device body 110, and the first radiating portion 1242 is disposed on the adjacent first surface S1 and the second surface S2 of the insulating carrier 1241. The first surface S1 is, for example, perpendicular to the second surface S2 and located between the second surface S2 and the conductive element 122 (shown in FIG. 2A). The first radiating portion 1242 overlaps the conductive element 122 in a direction D2 perpendicular to the length direction D1, so that the first radiating portion 1242 is coupled with the conductive element 122 to excite a first resonance mode.

The antenna element 124 further includes a ground structure 1243. The material of the ground structure 1243 is, for example, copper foil or aluminum foil, but the present disclosure is not limited thereto. The ground structure 1243 is connected to the metal housing 112 of the device body 110, and the ground structure 1243 is connected to the second surface S2 of the insulating carrier 1241. The first radiating portion 1242 has a feeding point 1242*a* and a ground point 1242*b*. The ground point 1242*b* is connected to the ground structure 1243. The first radiating portion 1242 and the ground structure 1243 form a loop to excite a second resonance mode (for example, 5 GHz).

In this embodiment, the antenna element 124 further includes a second radiating portion 1244. The second radiating portion 1244 is disposed on the first surface S1 and the second surface S2 of the insulating carrier 1241. The second radiating portion 1244 has an L-shaped segment on the first surface S1 of the insulating carrier 1241, and a portion 1244*a* of the L-shaped segment extends along the direction D2 and has a distance from the first radiating portion 1242. The other portion 1244*b* of the L-shaped segment extends along the length direction D1 of the main body portion 1221 and is away from the first radiating portion 1242, and becomes an open end of the second radiating portion 1244. The second radiating portion 1244 has a gap between a segment of the second surface S2 of the insulating carrier

1241 and the ground structure 1243, which becomes the other open end of the second radiating portion 1244. That is, the second radiating portion 1244 is separated from the first radiating portion 1242 and separated from the ground structure 1243, and the second radiating portion 1244 is in the form of open ends at both ends. The second radiating portion 1244 is coupled with the ground structure 1243 to excite a third resonance mode (for example, 6 GHz).

The structure of the conductive element 122 of this embodiment will be described in detail below.

Referring to FIG. 2A and FIG. 2C, in this embodiment, the assembly portion 1222 extends from the main body portion 1221 along a direction D2 perpendicular to the length direction D1. The number of the assembly portion 1222 is two, for example, and the two assembly portions 1222 are arranged at intervals along the length direction D1, so that the conductive element 122 has a 7*r*-shaped structure. In other embodiments, the number of the assembly portion 1222 may be only one or more than two, which is not limited in the present disclosure.

Figure 3A:
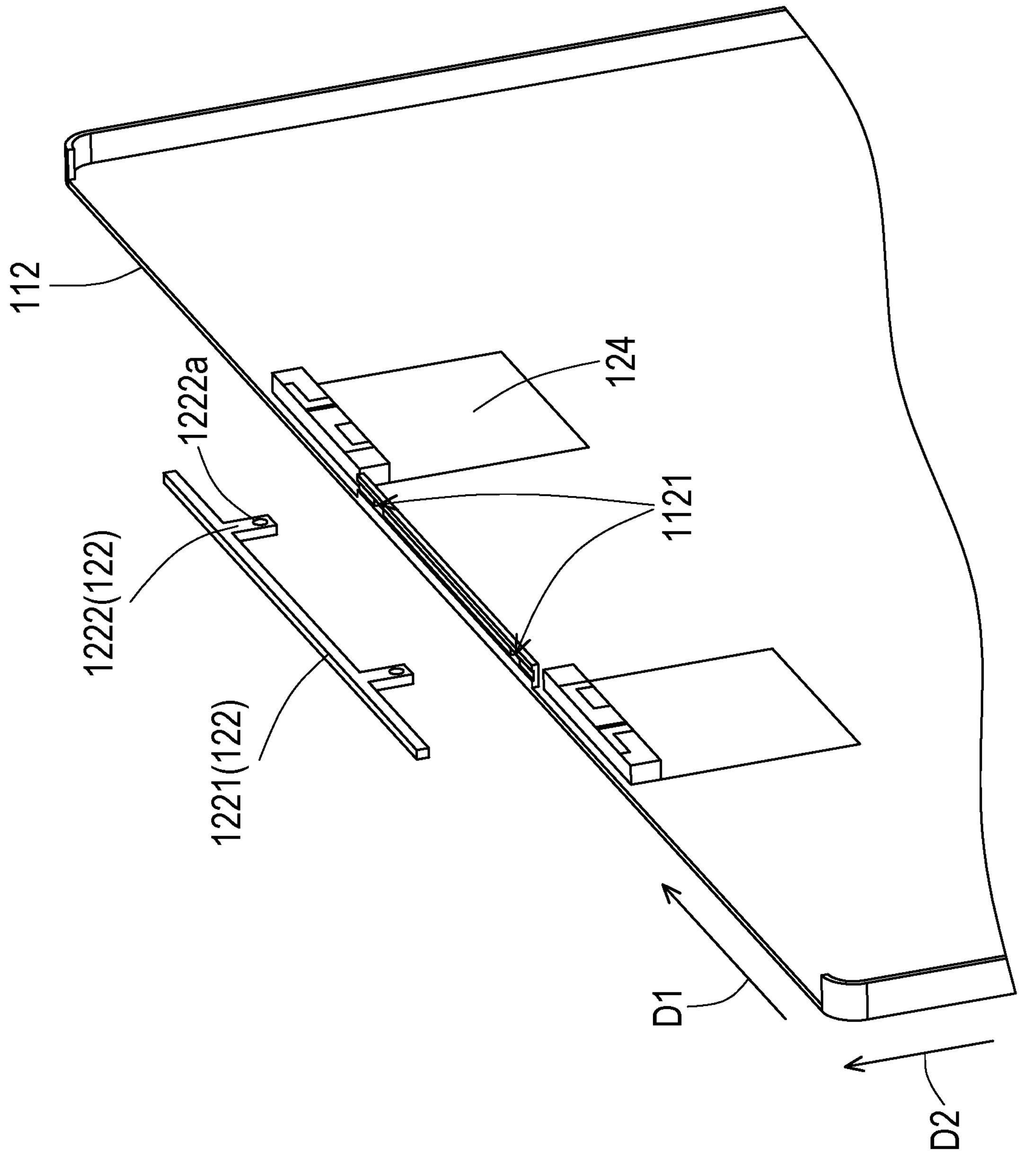
FIG. 3A and FIG. 3B are respectively schematic diagrams of the conductive element of FIG. 1A being separated from and assembled on the device body.
Figure 3B:
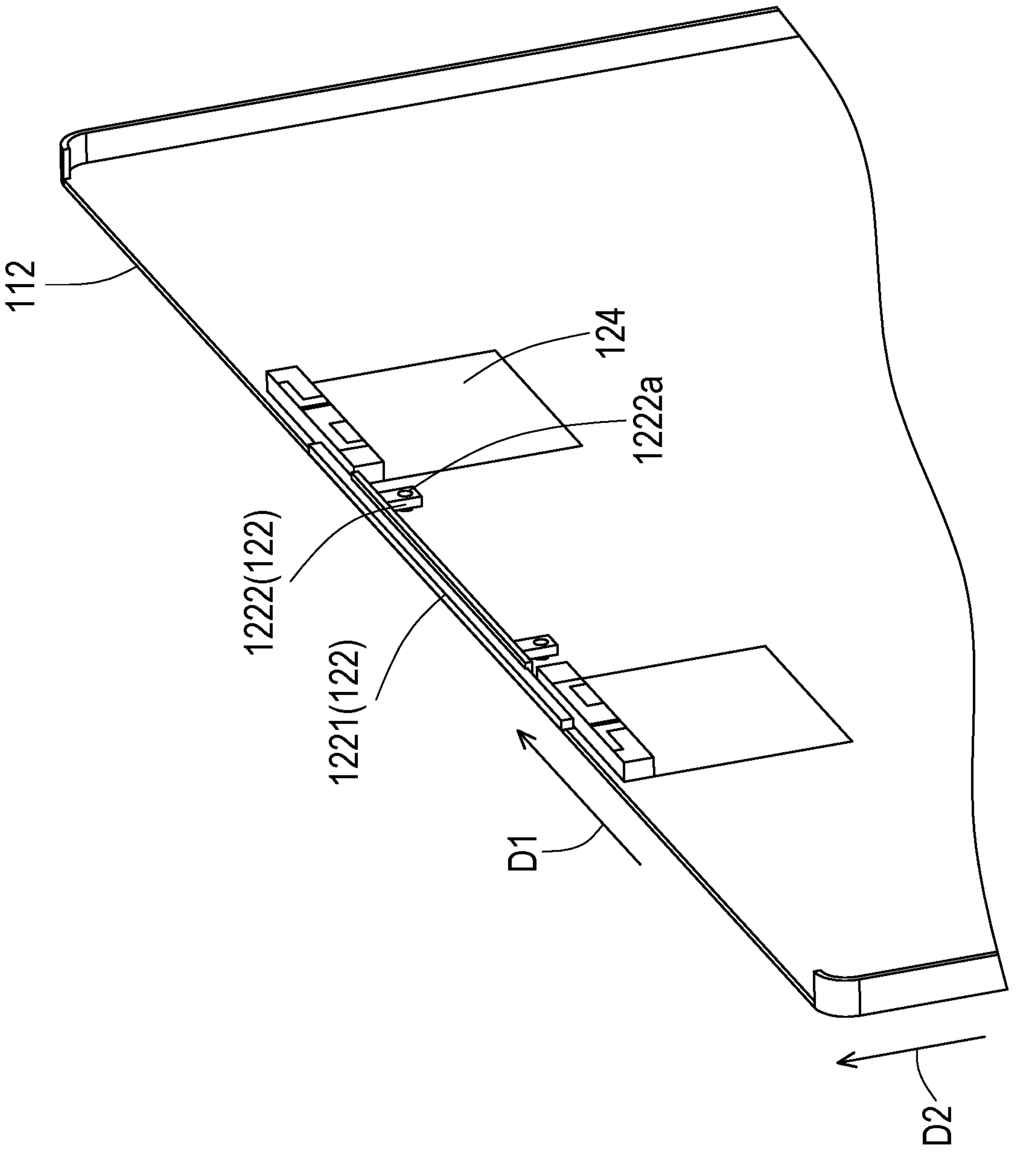

FIG. 3A and FIG. 3B are respectively schematic diagrams of the conductive element of FIG. 1A being separated from and assembled on the device body. Please refer to FIG. 3A and FIG. 3B. For example, the assembly portion 1222 extends to the metal housing 112 through the opening 1121 of the metal housing 112 and is assembled on the metal housing 112.

For example, the assembly portion 1222 has an assembly hole 1222*a*, and may be firmly fixed on the device body 110 through the assembly hole 1222*a* with a screw lock or other appropriate means, so that the conductive element 122 may be electrically connected to the metal housing 112. In addition, the main body portion 1221 of this embodiment is exposed from the device body 110. Through this arrangement, not only that it is possible to save the configuration space for antenna in the device body 110, but also that the signals excited by the first radiating portion 1242 and the conductive element 122 may be easily transmitted to the outer environment, thereby increasing the radiation efficiency of the antenna.

Figure 4:
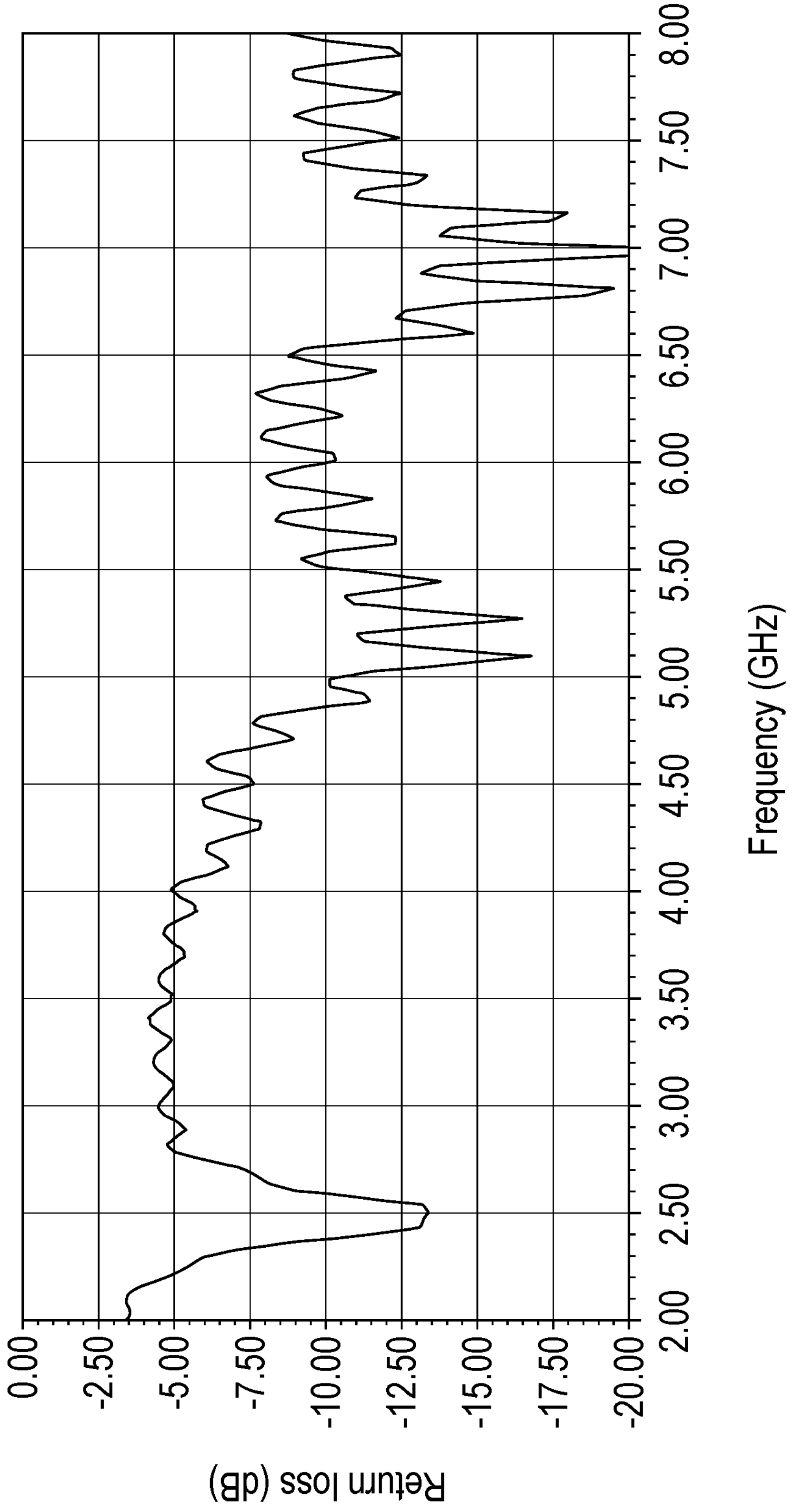
FIG. 4 is a diagram illustrating the return loss of the antenna module of FIG. 1.

FIG. 4 is a diagram illustrating the return loss of the antenna module of FIG. 1. As shown in FIG. 4, the return loss of the antenna module 120 of this embodiment has good performance in the first resonance mode (2.4 GHz), the second resonance mode (5 GHz) and the third resonance mode (6 GHz).

Figure 5:
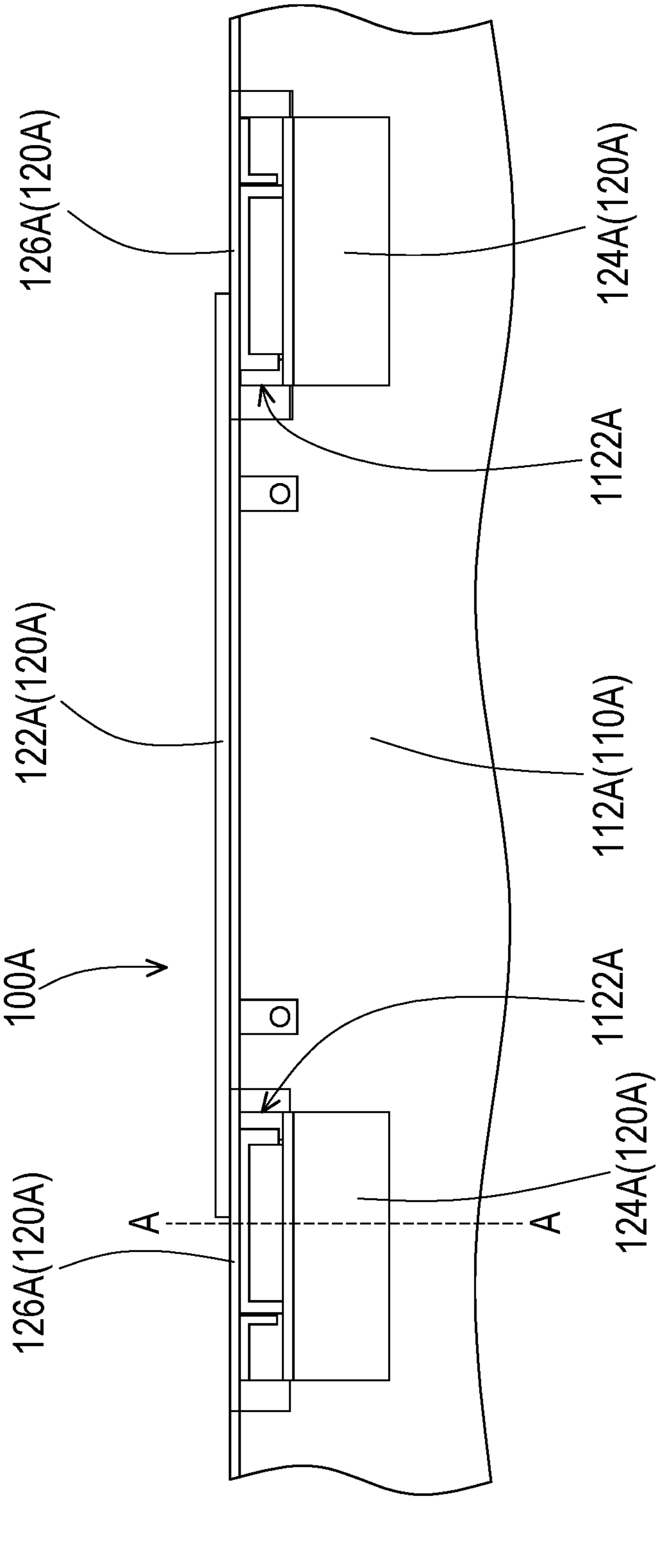
FIG. 5 is a partial perspective view of an electronic device according to another embodiment of the present disclosure.
Figure 6:
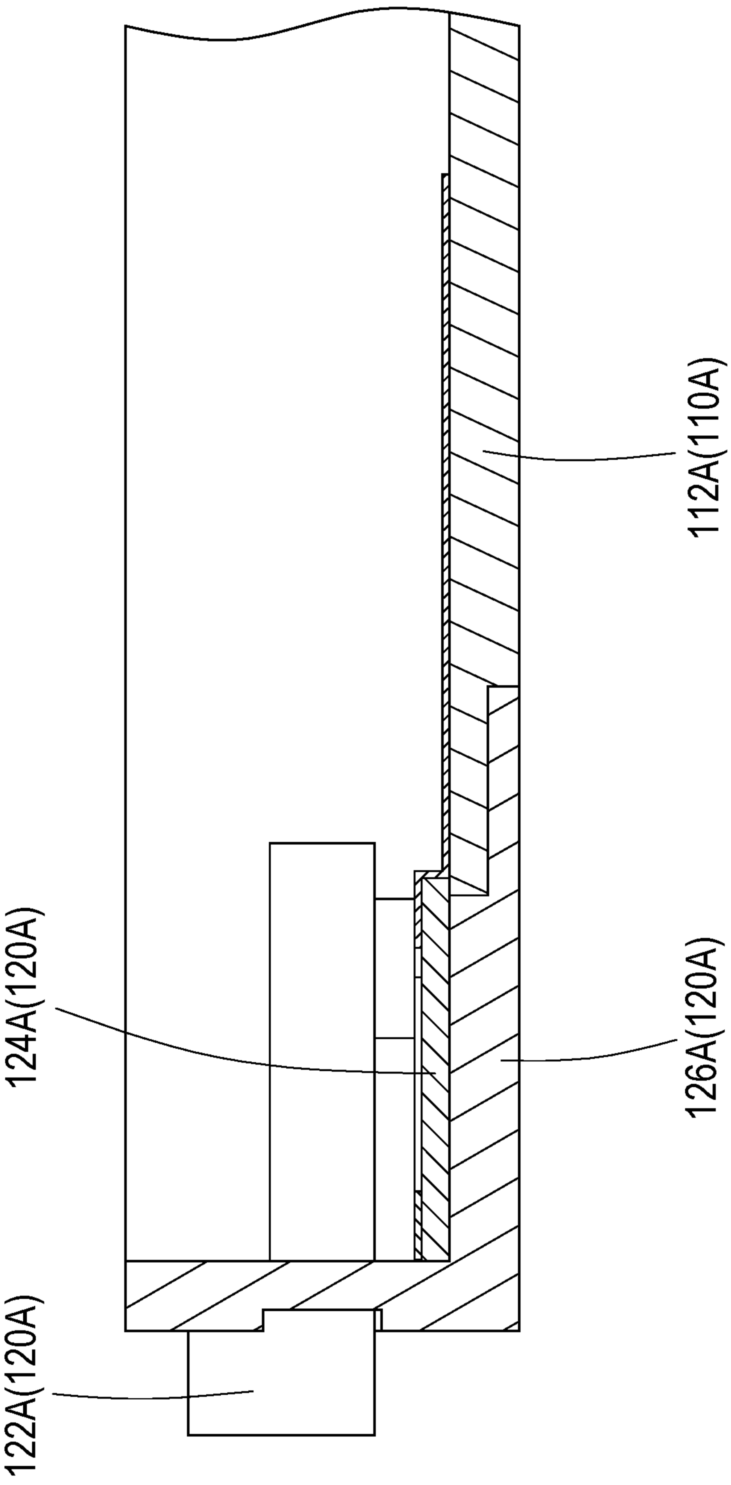
FIG. 6 is a cross-sectional view along line A-A of FIG. 5.

FIG. 5 is a partial perspective view of an electronic device according to another embodiment of the present disclosure. FIG. 6 is a cross-sectional view along line A-A of FIG. 5. In the electronic device 100A of FIG. 5, the configuration and function of the device body 110A, the conductive element 122A, and the antenna element 124A are the same or similar to the configuration and function of the device body 110, the conductive element 122, and the antenna element 124 of FIG. 2A, and the details are not repeated. The difference between the electronic device 100A in FIG. 5 and the electronic device 100 in FIG. 2A is that the antenna module 120A further includes at least one insulating structure 126A (two are shown).

Figure 7:
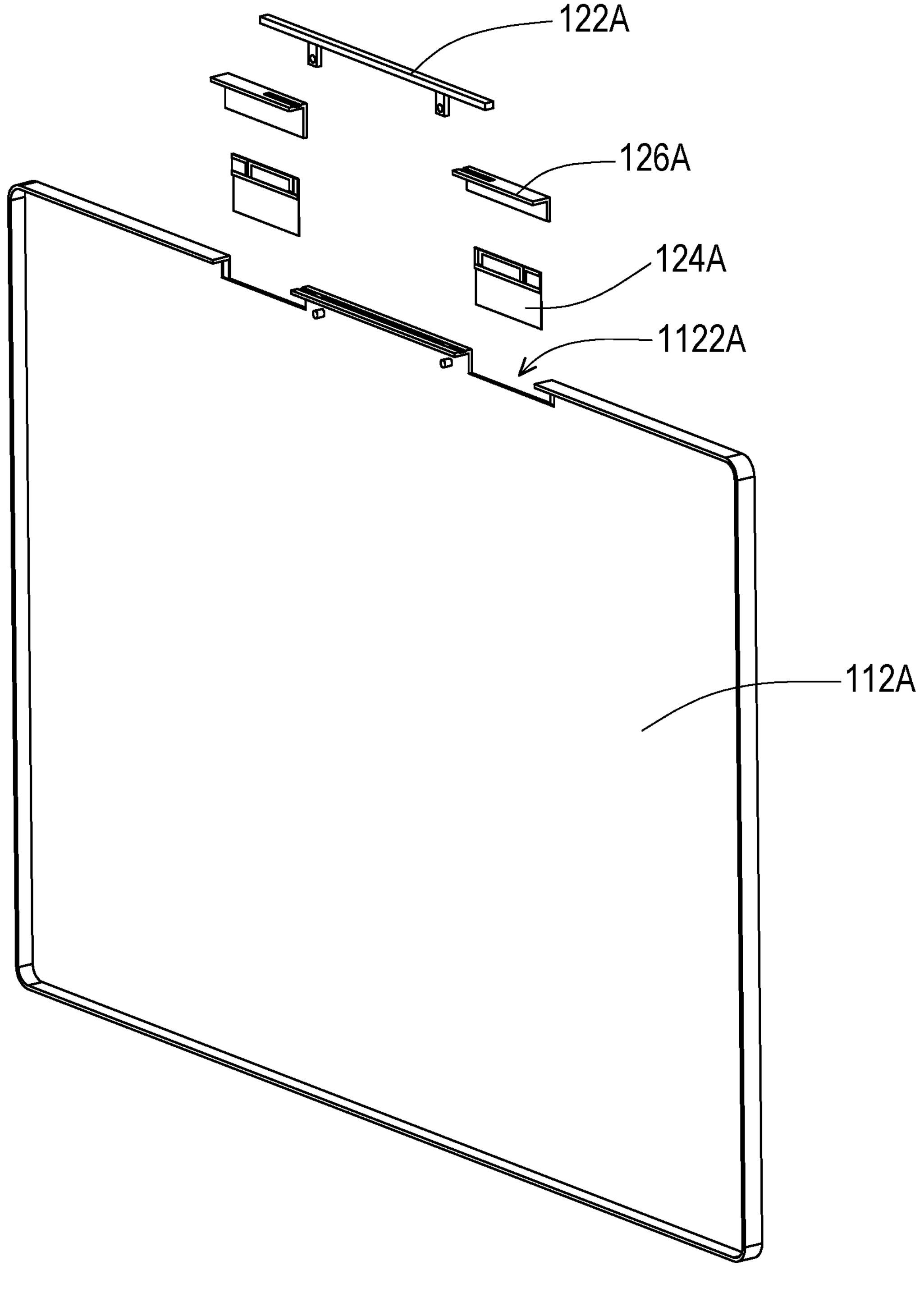
FIG. 7 is an exploded view of the electronic device of FIG. 5.

FIG. 7 is an exploded view of the electronic device of FIG. 5. Please refer to FIG. 5 to FIG. 7. Specifically, the metal housing 112A of the device body 110A has at least one open slot 1122A (two are shown). Insulating structures 126A (two are shown) are embedded in the slots 1122A, and antenna elements 124A (two are shown) are disposed on the insulating structure 126A. The insulating structure 126A may serve as an antenna clearance area for the antenna module 120A. Accordingly, the antenna element 124A is less likely to be shielded by the metal housing 112A and therefore has a better antenna efficiency.

Figure 8A:
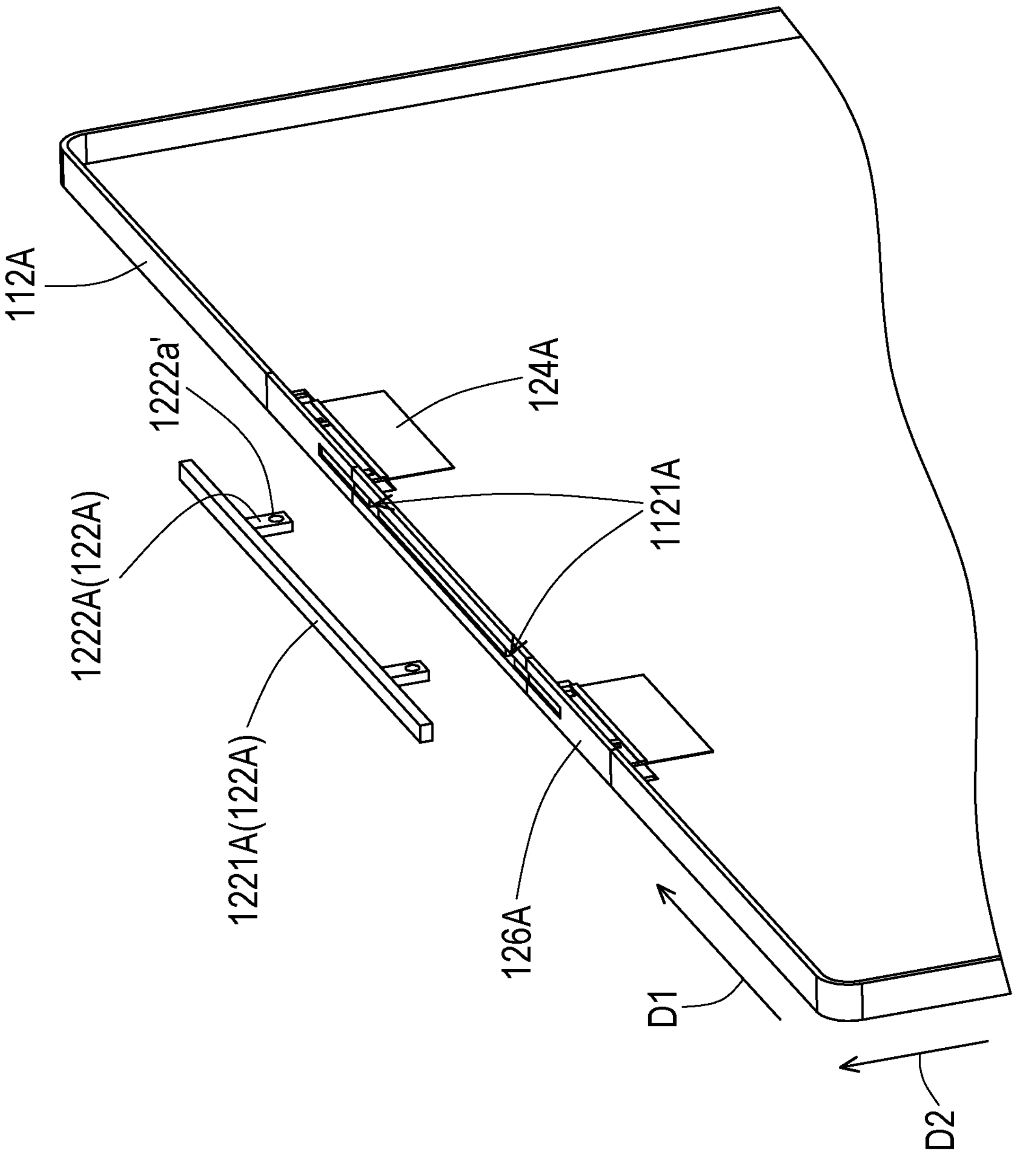
FIG. 8A and FIG. 8B are respectively schematic diagrams of the conductive element of FIG. 5 being separated from the device body and assembled on the device body.
Figure 8B:
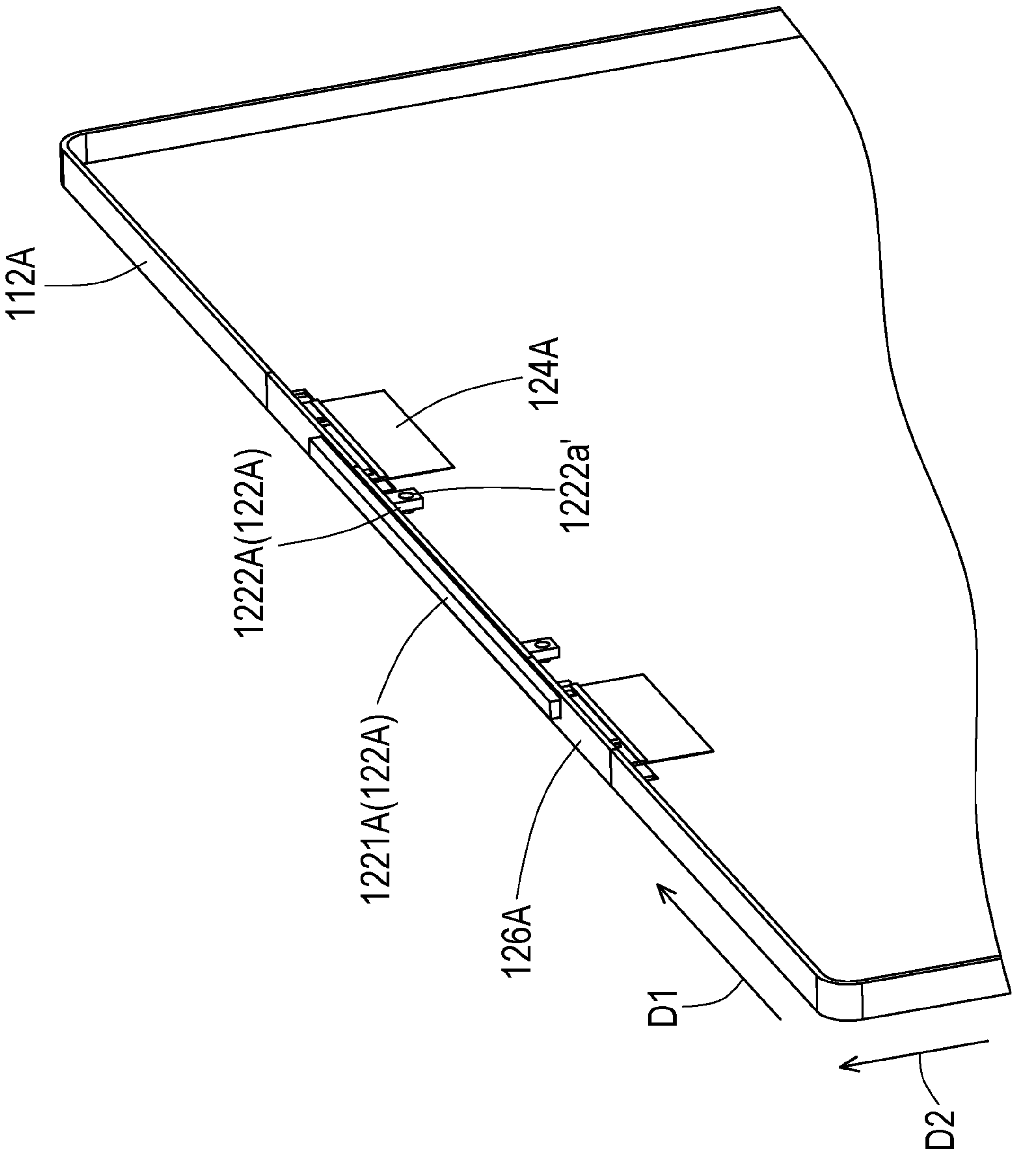

Referring to FIG. 8A and FIG. 8B, the assembly portion 1222A, for example, extends to the metal housing 112A through the opening 1121A of the metal housing 112A and is assembled on the metal housing 112A. The assembly portion 1222A has, for example, an assembly hole 1222*a*', and may be firmly fixed on the metal housing 112A through the assembly hole 1222*a*' with a screw lock or other appropriate means. In addition, when the assembly portion 1222A is assembled on the metal housing 112A, the main body portion 1221A is exposed from the metal housing 112.

To sum up, the antenna module of the present disclosure not only includes the antenna element, but also includes a conductive element for coupling with the antenna element to excite the first resonance mode. Accordingly, the size of the antenna element itself may be reduced, thereby reducing space requirement for configuration of the antenna element, and an antenna module with good radiation efficiency may be provided in a limited space (for example, inside the upper end of a screen of the notebook computer). Furthermore, the assembly portion of the conductive element of the present disclosure overlaps the antenna element in the length direction (for example, the length extension direction of the frame of the screen of a notebook computer) of the main body portion of the conductive element. In this way, in a direction perpendicular to the length direction (for example, the width direction of the frame of the screen of a notebook computer), the assembly portion of the conductive element will not exceed the range where the antenna element is located, and it will not be necessary to overly increase the configuration space for the arrangement of the conductive element.

What is claimed is:

1. An antenna module, adaptable for an electronic device, and the antenna module comprising:

a conductive element, comprising a main body portion and at least one assembly portion connected with each other, wherein the at least one assembly portion is assembled on a device body of the electronic device; and at least one antenna element, disposed on the device body and coupled with the conductive element to excite a first resonance mode, wherein the at least one assembly portion overlaps the at least one antenna element in a length direction of the main body portion, wherein the at least one antenna element comprises a ground structure and a first radiating portion, the ground structure is disposed on the device body, the first radiating portion has a feeding point and a ground point, and the ground point is connected to the ground structure, the first radiating portion and the ground structure form a loop to excite a second resonance mode.

2. The antenna module according to claim 1, wherein the at least one antenna element comprises an insulating, the insulating carrier is disposed in the device body, the first radiating portion is disposed on the insulating carrier, the first radiating portion overlaps the conductive element in a direction perpendicular to the length direction, so that the first radiating portion is coupled with the conductive element to excite the first resonance mode.

3. The antenna module according claim 2, wherein the at least one antenna element further comprises a second radiating portion, the second radiating portion is disposed on the insulating carrier and separated from the first radiating portion and the ground structure, the second radiating portion is coupled with the ground structure to excite a third resonance mode.

4. The antenna module according to claim 3, wherein the second radiating portion has an L-shaped segment.

5. The antenna module according to claim 1, wherein the device body comprises a metal housing, and the metal housing has at least one slot, the antenna module further comprises at least one insulating structure, and the at least one insulating structure is embedded in the at least one slot, and the at least one antenna element is disposed on the at least one insulating structure.

6. The antenna module according to claim 1, wherein the at least one assembly portion extends from the main body portion in a direction perpendicular to the length direction.

7. The antenna module according to claim 1, wherein the number of the at least one assembly portion is two, and the two assembly portions are arranged at intervals along the length direction.

8. The antenna module according to claim 1, wherein the device body comprises a frame, the frame covers the antenna element, and the length direction is perpendicular to a width direction of the frame.

9. The antenna module according to claim 1, wherein the main body portion is exposed from the device body.

* * * * *